(12) United States Patent
Tsuchiya et al.

(10) Patent No.: US 8,869,632 B2
(45) Date of Patent: Oct. 28, 2014

(54) SENSOR DEVICE, FORCE DETECTION DEVICE, AND ROBOT

(75) Inventors: Kazuhiro Tsuchiya, Azumino (JP); Toshiyuki Kamiya, Fujimi (JP)

(73) Assignee: Seiko Epson Corporation (JP)

( * ) Notice: Subject to any disclaimer, the term of this patent is extended or adjusted under 35 U.S.C. 154(b) by 372 days.

(21) Appl. No.: 13/445,540

(22) Filed: Apr. 12, 2012

(65) Prior Publication Data

US 2012/0260745 A1    Oct. 18, 2012

(30) Foreign Application Priority Data

Apr. 14, 2011   (JP) ................... 2011-089841

(51) Int. Cl.
| | | |
|---|---|---|
| *G01L 1/10* | (2006.01) | |
| *G01L 1/16* | (2006.01) | |
| *B25J 13/08* | (2006.01) | |
| *G01L 5/22* | (2006.01) | |

(52) U.S. Cl.
CPC ............. *B25J 13/085* (2013.01); *G01L 1/16* (2013.01); *G01L 5/226* (2013.01)
USPC ................... 73/862.59; 73/862.68

(58) Field of Classification Search
USPC ............................ 73/862.59, 862.68, 862.044
See application file for complete search history.

(56) References Cited

U.S. PATENT DOCUMENTS

| | | | | |
|---|---|---|---|---|
| 5,178,012 | A * | 1/1993 | Culp ........................... 73/510 |
| 5,241,235 | A * | 8/1993 | Culp ........................... 310/328 |
| 5,285,690 | A * | 2/1994 | Koen et al. .................. 73/727 |
| 5,297,430 | A * | 3/1994 | Sonderegger et al. ... 73/862.043 |
| 5,407,501 | A * | 4/1995 | Koen et al. ................... 156/64 |
| 6,326,563 | B1 * | 12/2001 | Takeuchi et al. .......... 177/210 FP |
| 7,127,949 | B2 * | 10/2006 | Akkipeddi et al. ............. 73/777 |
| 2004/0084999 | A1 * | 5/2004 | Yamauchi ..................... 310/328 |
| 2007/0114643 | A1 * | 5/2007 | DCamp et al. ................ 257/678 |
| 2009/0295255 | A1 * | 12/2009 | Nagaya et al. ................ 310/358 |
| 2010/0242606 | A1 * | 9/2010 | Kanemoto ................. 73/514.38 |
| 2012/0204656 | A1 * | 8/2012 | Suzuki ........................ 73/862.59 |
| 2013/0112010 | A1 * | 5/2013 | Matsumoto et al. ..... 73/862.044 |
| 2013/0233089 | A1 * | 9/2013 | Kawai et al. ................ 73/862.68 |

FOREIGN PATENT DOCUMENTS

| | | |
|---|---|---|
| JP | 04-231827 | 8/1992 |
| JP | 05-244783 | 9/1993 |
| JP | 06-258163 | 9/1994 |
| JP | 2000-269740 | 9/2000 |
| JP | 2006-094372 | 4/2006 |
| JP | 2007-136668 | 6/2007 |
| JP | 2007-527515 | 9/2007 |
| JP | 2009-118143 | 5/2009 |
| JP | 2010131676 A * | 6/2010 |
| JP | 2010-230441 | 10/2010 |
| JP | 2010-249805 | 11/2010 |
| JP | 2013107205 A * | 6/2013 |
| JP | 2013130432 A * | 7/2013 |

* cited by examiner

*Primary Examiner* — Lisa Caputo
*Assistant Examiner* — Jamel Williams
(74) *Attorney, Agent, or Firm* — Harness, Dickey & Pierce, P.L.C.

(57) ABSTRACT

A sensor device includes a sensor element which is formed by laminating a piezoelectric substance and an electrode, a first case and a second case which house the sensor element therein, and a pressing portion which presses the sensor element in the lamination direction of the piezoelectric substance and the electrode via the first and second cases.

12 Claims, 8 Drawing Sheets

SENSOR DEVICE, FORCE DETECTION DEVICE, AND ROBOT

BACKGROUND

1. Technical Field

The present invention relates to a sensor device, a force detection device, and a robot.

2. Related Art

In the related art, a force sensor using a piezoelectric material as described in JP-A-4-231827 is known. That is, in FIG. 15 of JP-A-4-231827, a force sensor is described in which a signal electrode 15 is clamped by crystal discs 16 made of a piezoelectric material, and a plurality of measurement elements clamped by metal cover discs 17 are arranged.

However, in the measurement element described in JP-A-4-231827, there is no description that the two crystal discs which clamp the signal electrode in the force detection direction accurately arrange the crystal direction to form the measurement element. It is difficult to form the sensor element while arranging the crystal direction of the crystal disc with high precision so as to obtain an output signal with high precision as the force sensor. When a plurality of sensor elements are arranged and used as a force sensor, degradation in sensor sensitivity during operation can occur due to, for example, movement of the sensor elements when the sensor elements are arranged in the device or fixed to the device, or misalignment between the elements may occur due to minor impact.

SUMMARY

An advantage of some aspects of the invention is that it provides a sensor device, a force detection device, and a robot capable of maintaining high sensor sensitivity without misalignment of sensor elements during integration in the force detection device.

APPLICATION EXAMPLE 1

This application example of the invention is directed to a sensor device including a sensor element which is formed by laminating a piezoelectric substance and an electrode, a first case and a second case which store the sensor element, and a pressing portion which presses the sensor element in the lamination direction of the piezoelectric substance and the electrode by the first case and the second case.

According to this application example, while the sensor element is stored in the internal space defined by the first case and the second case, the sensor element is pressed in the lamination direction of the piezoelectric substance and the electrode. Therefore, it is possible to suppress integration misalignment of the piezoelectric substance and the electrode due to vibration when carrying the sensor device or external force during integration in the device, and to stably maintain high detection precision of the sensor device.

APPLICATION EXAMPLE 2

This application example of the invention is directed to the above-described application example, wherein the pressing portion is an elastic member which is pressed by the first case and the second case.

According to the above-described application example, an elastic member having desired elastic force is selected and used, making it easy to adjust a pressing force against the sensor element. The elastic member functions as a buffer material which suppresses the application of an excessive pressing force to the sensor element, thereby preventing the sensor element, and in particular the piezoelectric substance, from being damaged.

APPLICATION EXAMPLE 3

This application example of the invention is directed to the above-described application example, wherein the elastic member is a gasket which is formed of rubber, an elastic elastomer, or a metal.

According to the above-described application example, the material, size, and sectional shape of the gasket are appropriately selected, thereby setting an appropriate pressing force, suppressing the application of an excessive pressing force to the sensor element, and preventing the sensor element, and in particular the piezoelectric substance, from being damaged.

APPLICATION EXAMPLE 4

This application example of the invention is directed to the above-described application example, wherein the pressing portion is a bellows portion which is formed in the first case or the second case.

According to the above-described application example, a bellows shape having excellent stretchability is provided, thereby easily adjusting a pressing force against the sensor element, suppressing the application of an excessive pressing force to the sensor element, and preventing the sensor element, and in particular the piezoelectric substance, from being damaged.

APPLICATION EXAMPLE 5

This application example of the invention is directed to the above-described application example, wherein the first case and the second case have a connection portion which connects the first case and the second case.

According to the above-described application example, the first case and the second case are connected together by the connection portion to form a storage case for the sensor element, thereby integrating the sensor element in the apparatus or device in a state where the pressing force applied to the sensor element by the pressing portion is maintained. Therefore, it is possible to suppress integration misalignment of the piezoelectric substance and the electrode due to vibration when carrying the sensor device or external force during integration in the device, and to stably maintain high detection precision of the sensor device.

APPLICATION EXAMPLE 6

This application example of the invention is directed to the above-described application example, wherein when the lamination direction of the sensor element is a Z direction, and directions which are orthogonal to the Z direction and orthogonal to each other are respectively an X direction and a Y direction, the sensor device includes at least a first sensor element which detects a force in the X direction, a second sensor element which detects a force in the Y direction, and a third sensor element which detects a force in the Z direction.

According to the above-described application example, relative misalignment of the sensor elements which detect force in the X, Y, and Z directions, a so-called 3-axis direction, is suppressed. Therefore, it is possible to stably maintain high detection precision with no loss in a sensor device which detects force in the three-axis direction.

APPLICATION EXAMPLE 7

This application example of the invention is directed to the above-described application example, wherein the piezoelectric substance is quartz crystal.

According to the above-described application example, quartz crystal is used as the piezoelectric substance, thereby obtaining a sensor device which includes a sensor element having high detection capability capable of generating a large quantity of electric charges with slight deformation. It is also possible to easily obtain a piezoelectric substance which detects deformation in various directions depending on the cut direction of the quartz crystal.

APPLICATION EXAMPLE 8

This application example of the invention is directed to a force detection device including the above-described sensor device.

The force detection device of this application example can easily calculate and measure an external force load depending on the quantity of electric charges and the polarity of the electric charges. Thus, it is possible to obtain a 3-axis force detection sensor with simple configuration. With the use of a plurality of sensor devices, it is possible to easily obtain a 6-axis force detection device or the like which includes torque measurement, for example.

APPLICATION EXAMPLE 9

This application example of the invention is directed to a robot including the above-described force detection device.

The robot of this application example reliably detects contact of an actuating robot arm or robot hand with an obstacle during a predetermined operation or a contact force of the robot arm or robot hand with an object by the force detection device, and feeds back the detection result to a robot control device, thereby enabling stable and fine operation.

BRIEF DESCRIPTION OF THE DRAWINGS

The invention will be described with reference to the accompanying drawings, wherein like numbers reference like elements.

FIG. 1A is a schematic sectional view in a lamination direction, FIG. 1B is a sectional view along line A-A' in FIG. 1A, and FIG. 1C is an enlarged sectional view of the B portion in FIG. 1A.

DESCRIPTION OF EXEMPLARY EMBODIMENTS

Figure 1A:
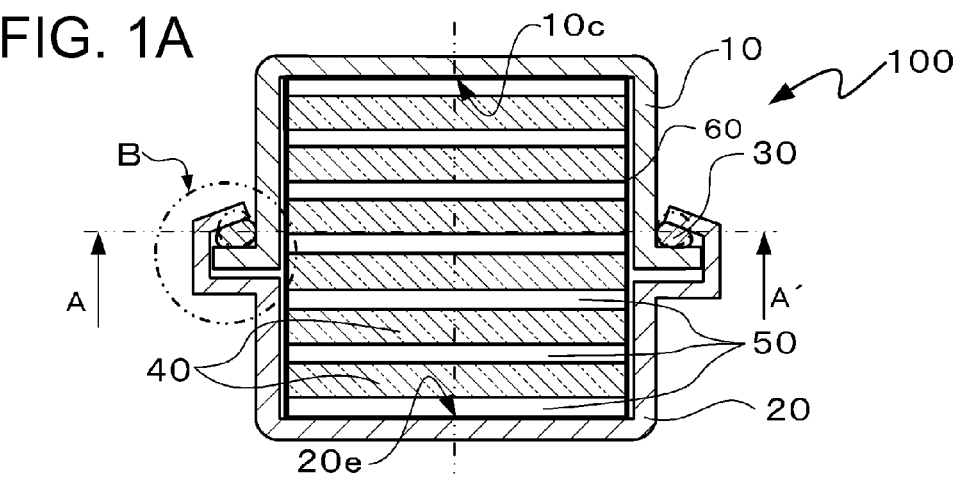
FIGS. 1A to 1C show a sensor device according to a first embodiment, specifically.
Figure 1B:
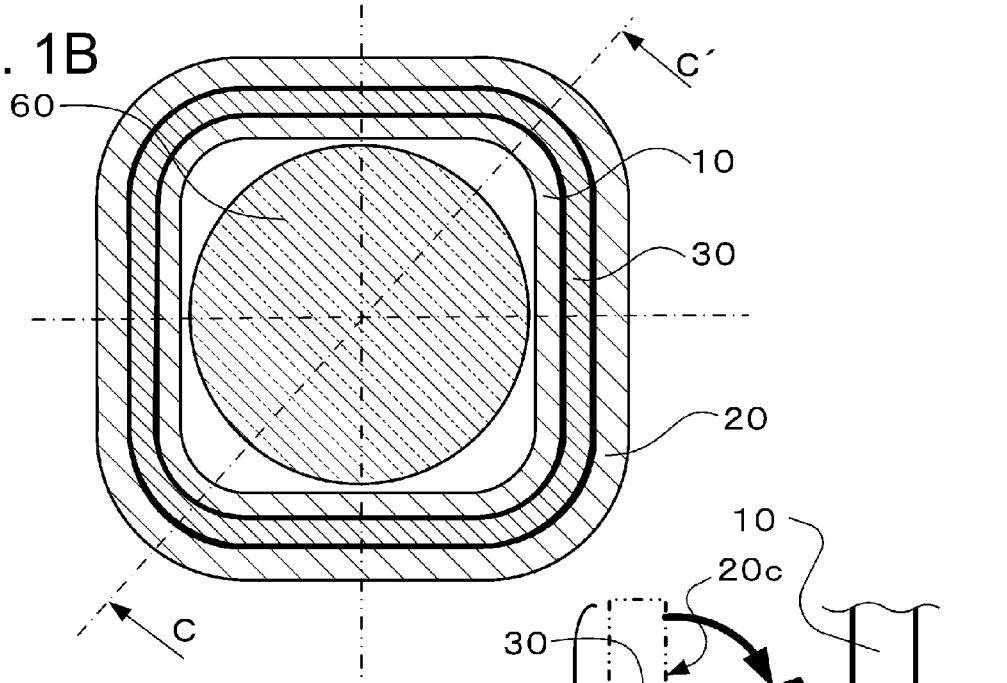
Figure 1C:
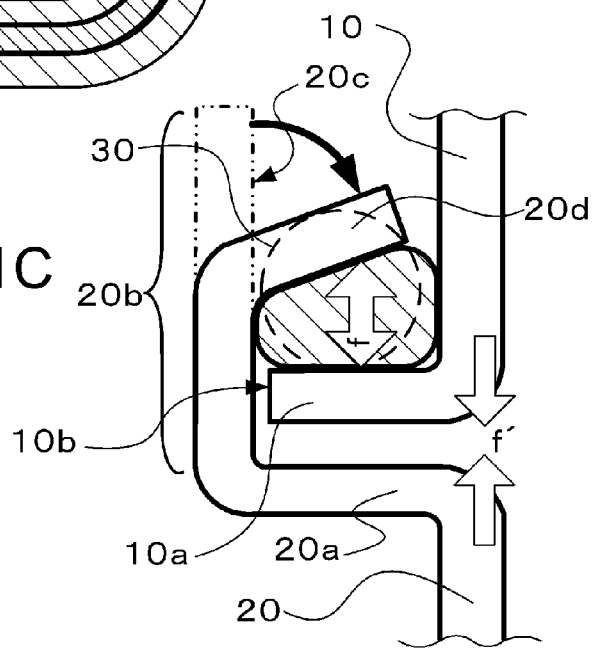

Hereinafter, embodiments of the invention will be described with reference to the drawings.
First Embodiment FIGS. 1A to 1C show a sensor device of this embodiment. FIG. 1A is a schematic sectional view in a lamination direction, FIG. 1B is a sectional view along line A-A' in FIG. 1A, and FIG. 1C is an enlarged sectional view of the B portion in FIG. 1A. As shown in FIGS. 1A to 1C, a sensor device 100 has a first case 10 and a second case 20 which are connected together while pressing a gasket 30 serving as a pressing mechanism by flange portions 10a and 20a serving as a connection portion. As shown in FIG. 1B, a sensor element 60 in which a piezoelectric substance 40 and an electrode 50 having a circular outline are alternately laminated is stored in the internal space defined by the first case 10 and the second case 20.

Figure 2A:
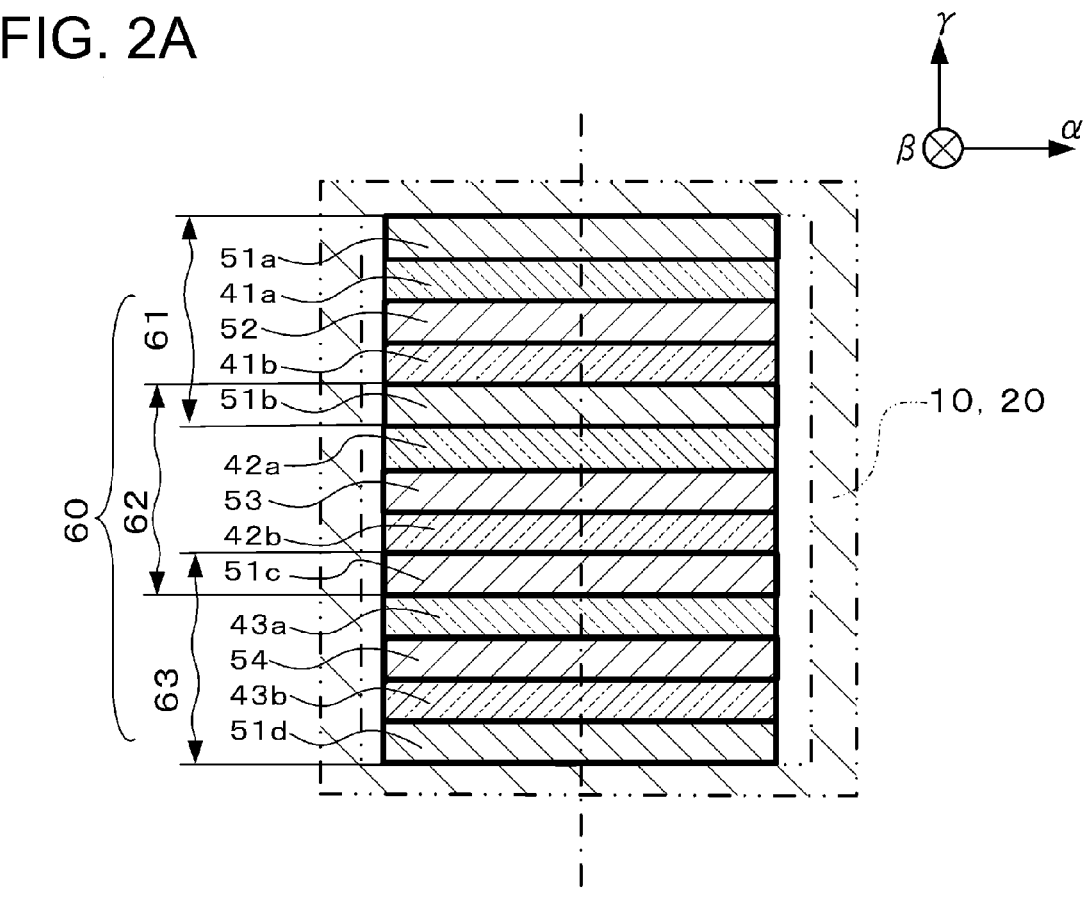
FIG. 2A is a schematic sectional view showing a sensor element according to the first embodiment.

The sensor element 60 is a plate-shaped piezoelectric substrate which is formed of, for example, quartz crystal, lead zirconate titanate <$PZT:Pb(Zr,Ti)O_3$>, lithium niobate ($LiNbO_3$), or the like. In this embodiment, the piezoelectric substance 40 (hereinafter, referred to as a quartz crystal plate 40) in which a quartz crystal substrate is formed in a disc shape is used. As shown in FIG. 1A, the quartz crystal plate 40 is clamped by the electrodes 50. A plurality of quartz crystal plates 40 are laminated to form the sensor element 60. As shown in FIG. 2A, in the sensor element 60, quartz crystal plates 41a, 41b, 42a, 42b, 43a, and 43b and electrodes 51a, 51b, 51c, 51d, 52, 53, and 54 which clamp the quartz crystal plates 41a, 41b, 42a, 42b, 43a, and 43b are laminated to form the sensor element 60.

Figure 2B:
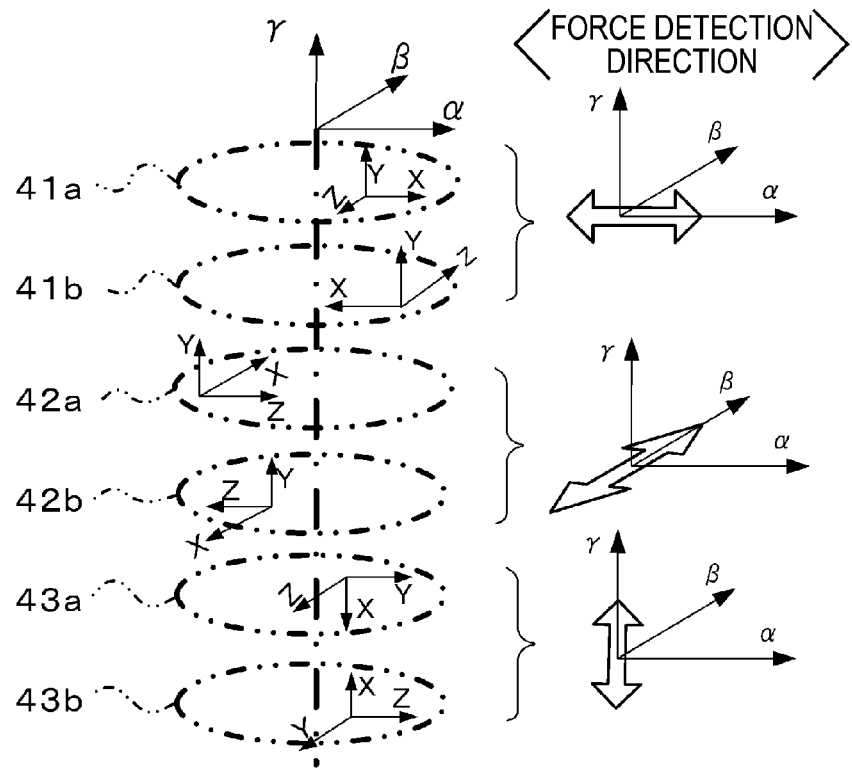
FIG. 2B is a schematic view illustrating a lamination direction of a quartz crystal plate.

As shown in the schematic view of FIG. 2B, the quartz crystal plates 41a, 41b, 42a, and 42b are formed of so-called Y-cut plates. When the lamination direction of the sensor element 60 is γ, and directions which are orthogonal to γ and are orthogonal to each other are α and β, the quartz crystal plates 41a and 41b are laminated such that the Y axis of the quartz crystal plate is in the γ direction. In this example, the X axis of the quartz crystal plate 41a is in the α(+) direction, and the X axis of the quartz crystal plate 41b is in the α(−) direction. The quartz crystal plates 41a and 41b are arranged to be clamped by the electrodes 51a, 52, and 51b, thereby forming a sensor element 61 which can detect displacement according to a force applied in the α direction by the quartz crystal plates 41a and 41b.

Similarly, the quartz crystal plates 42a and 42b are laminated such that the Y axis of the quartz crystal plate is in the γ direction. In this example, the X axis of the quartz crystal plate 42a is in the β(+) direction, and the X axis of the quartz crystal plate 42b is in the β(−) direction. The quartz crystal plates 42a and 42b are arranged to be clamped by the electrodes 51b, 53, and 51c, thereby forming a sensor element 62 which can detect displacement according to a force applied in the β direction by the quartz crystal plates 42a and 42b.

The quartz crystal plates 43a and 43b are formed of so-called X-cut plates. The quartz crystal plate 43a is laminated such that the X axis of the quartz crystal plate is in the γ(−) direction, and the quartz crystal plate 43b is laminated such that the X axis of the quartz crystal plate is in the γ(+) direction. The Y and Z axes are arranged to be orthogonal to each other in the quartz crystal plates 43a and 43b. The quartz crystal plates 43a and 43b are arranged to be clamped by the electrodes 51c, 54, and 51d, thereby forming a sensor element 63 which can detect displacement according to a force in the γ direction by the quartz crystal plates 43a and 43b. Thus, the sensor element 60 which can detect the force in the so-called 3-axis direction by the sensor elements 61, 62, and 63 is formed.

The sensor element 60 has a structure in which the quartz crystal plates 41a, 41b, 42a, 42b, 43a, and 43b and the electrodes 51a, 51b, 51c, 51d, 52, 53, and 54 are just placed in the lamination direction, and a fixing mechanism, for example, adhesion is not used. However, as shown in FIG. 2B, if the lamination direction of the quartz crystal plates 41a, 41b, 42a, 42b, 43a, and 43b is not accurately maintained, errors may occur in the displacement detection direction, that is, the force detection direction. Accordingly, a mechanism for pressing the sensor element 60 in the lamination direction of the sensor element 60 by the connection of the first case 10 and the second case 20 shown in FIG. 1A is provided.

The connection of the first case 10 and the second case 20 of the sensor device 100 shown in FIG. 1A is done as follows. FIG. 1C is a detailed sectional view of the B portion in FIG. 1A corresponding to the connection portion of the first case 10 and the second case 20. As shown in FIG. 1C, a flange portion 10a is formed in the opening end portion of the first case 10. A flange portion 20a and a cylindrical portion 20b extending from the flange portion 20a are formed in the opening end portion of the second case 20. An outline 10b of the flange portion 10a of the first case 10 can be inserted into an inner circumference 20c of the cylindrical portion 20b.

The first case 10 and the second case 20 are covered such that the sensor element 60 is stored inside the first case 10 and the second case 20, and the flange portion 10a of the first case 10 is inserted into the inner circumference 20c of the cylindrical portion 20b of the second case 20. Thereafter, the gasket 30 is placed on the flange portion 10a, a part of the cylindrical portion 20b on the opening side is bent in an arrow direction of the drawing to form a so-called caulking portion 20d, and the gasket 30 is compressed by the caulking portion 20d. In this way, the first case 10 and the second case 20 are connected together. At this time, the gasket 30 is compressed by the caulking portion 20d, and a repulsive force indicated by an arrow f is generated. With this repulsive force f, the first case 10 and the second case 20 are attracted in an arrow f' direction, and the sensor element 60 is pressed in the lamination direction and fixed through a sensor pressing portion 10c of the first case 10 and a sensor pressing portion 20e of the second case 20 shown in FIG. 1A. That is, the gasket 30 is provided as a pressing mechanism of the sensor device 100. The gasket 30 may be elastic and is formed of, for example, rubber, an elastic elastomer, or the like. Alternatively, the pressing mechanism is not limited to a gasket shape, and may have a resilient washer shape, such as a spring washer or a corrugated washer. Since the first and second cases have a caulking structure through the gasket, excessive precision relating to the dimension of the caulking portion of the case is not necessary, and assembling is easily performed. Therefore, it is possible to form a sensor device at low cost.

The gasket 30 serving as the pressing mechanism is compressed, and the sensor element 60 stored in the first case 10 and the second case 20 is pressed and fixed by the repulsive force, making it possible to obtain a stable pressing force. In a force detection device using the sensor device 100 described below, even if the force detection device is used in an environment in which the force detection device is exposed to, for example, a lubricant, a liquid such as water or medicine, or the like, the gasket 30 has a function as a seal member, thereby protecting the internal sensor element 60. Therefore, it is possible to obtain the reliable sensor device 100.

Figure 3A:
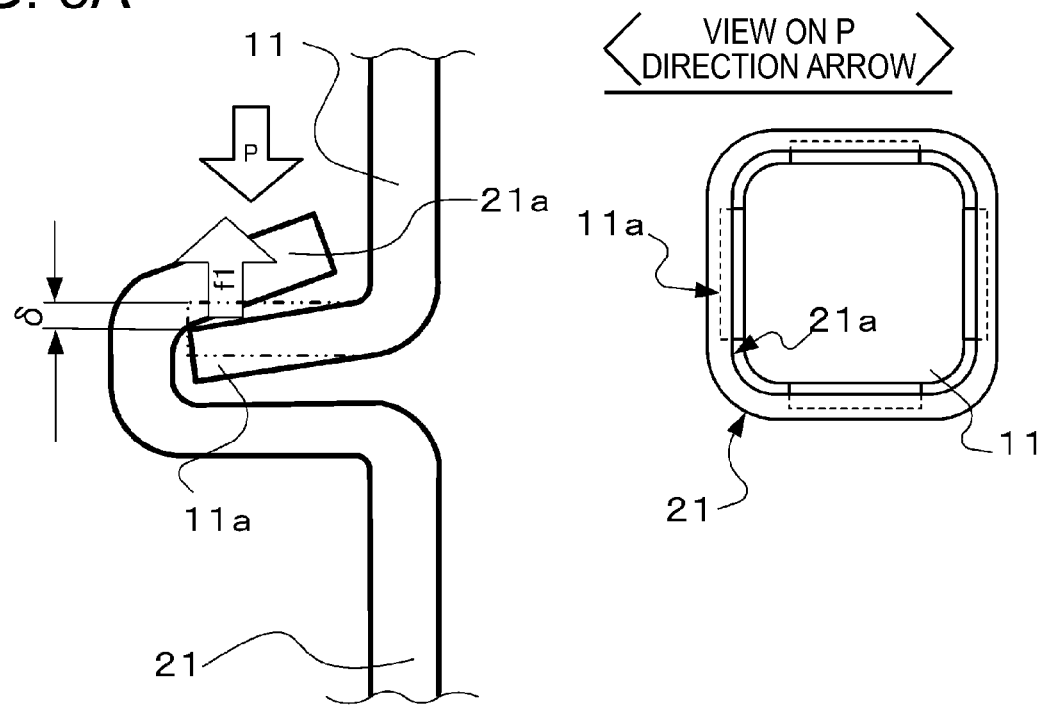
FIG. 3A is a partial sectional view of a connection portion in a sensor device according to another embodiment.
Figure 3B:
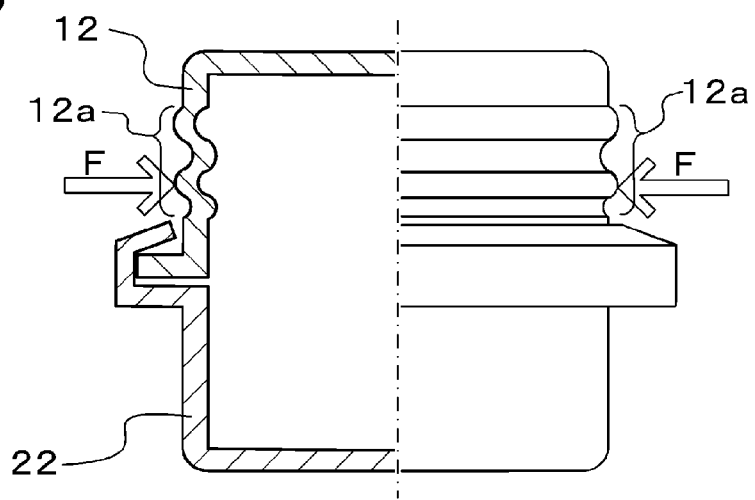
FIG. 3B is a side sectional view of a bellows portion.

Although in the sensor device 100, the gasket 30 is a component serving as the pressing mechanism, the invention is not limited thereto, and, for example, a form shown in FIGS. 3A and 3B may be used. FIG. 3A is a sectional view showing another form of the connection portion (B portion) shown in FIG. 1A. In the connection portion shown in FIG. 3A, the flange portion 11a formed in the opening of the first case 11 is caulked and fixed to the second case 21 by the caulking portion 21a to generate deflection δ within a range of elastic deformation of the flange portion 11a, and a force which returns the deflection δ to the original state, that is, an elastic force f1 becomes a pressing mechanism as a force which presses and fixes the sensor element 60. As shown in the view of the P direction arrow, the flange portion 11a may be segmented such that the elastic force f1 does not excessively increase relative to the deflection δ of the flange portion 11a.

As shown in FIG. 3B, a bellows portion 12a serving as a pressing mechanism may be provided in the cylindrical portion of the first case 12, and the sensor element 60 may be pressed and fixed by stretchability of the bellows portion 12a. With this configuration, even if the first case 12 is formed of a sheet material to improve the stretchability of the bellows portion 12a, it is possible to form a case having high strength against an external force F from the cylindrical outline. Although the bellows portion 12a is not limited to this embodiment, when the bellows portion 12a contracts, the bellows portion 12a has a shape having an inner diameter which does not interfere with, at least, the sensor element 60 stored therein.

Figure 4A:
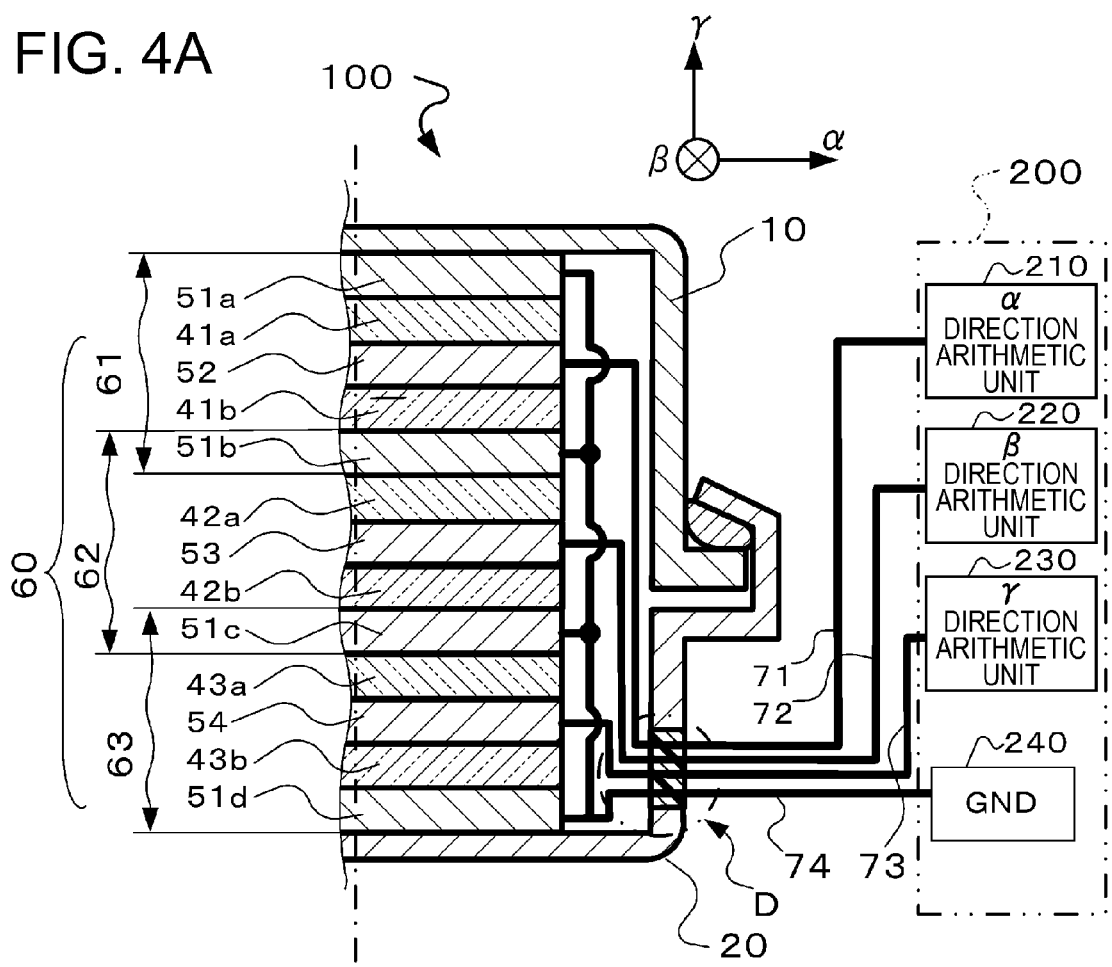
FIG. 4A is an explanatory view of wiring line of the sensor device according to the first embodiment.
Figure 4B:
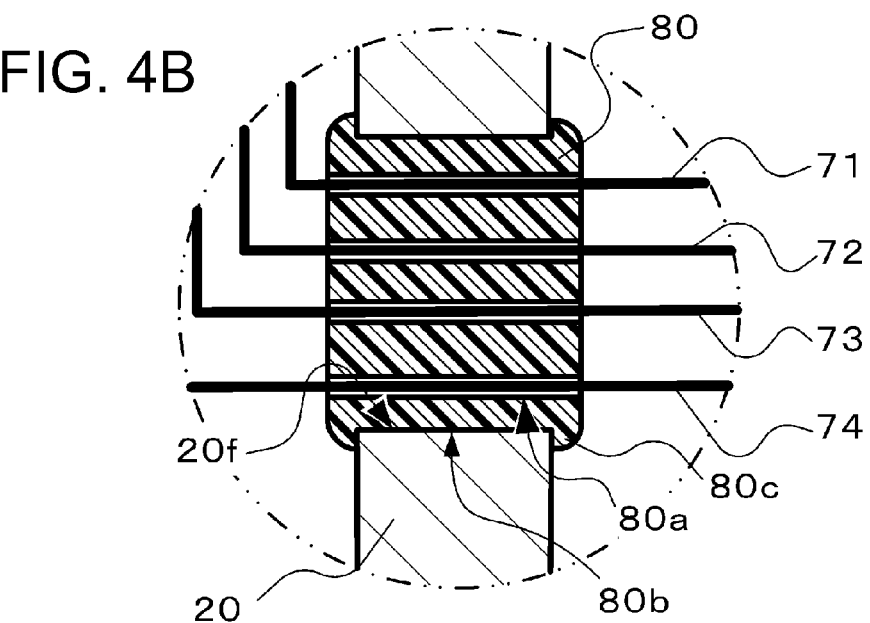
FIG. 4B is a partial enlarged view of the D portion in FIG. 4A.

FIG. 4A is a sectional view along line C-C' shown in FIG. 1B, and FIG. 4B is an enlarged view of the D portion shown in FIG. 4A. As shown in FIG. 4A, wiring lines 71, 72, 73, and 74 which are connected to an external arithmetic device 200 are arranged in a space between the outline portion of the sensor element 60 shown in FIG. 1B and the internal space of the first case 10 and the second case 20. As described with reference to FIGS. 2A and 2B, the sensor element 60 includes the sensor element 61 which can detect displacement according to the force in the α direction, the sensor element 62 which can detect displacement according to the force in the β direction, and the sensor element 63 which can detect displacement according to the force in the γ direction. The wiring line 71 from the electrode 52 of the sensor element 61 is connected to an α direction arithmetic unit 210 in the arithmetic device 200. The wiring line 72 from the electrode 53 of the sensor element 62 is connected to a β direction arithmetic unit 220, and the wiring line 73 from the electrode 54 of the sensor element 63 is connected to a γ direction arithmetic unit 230. The force in the respective directions is calculated by the arithmetic units 210, 220, and 230. Ground electrodes 51a, 51b, 51c, and 51d of the sensor elements 61, 62, and 63 are connected to a ground (GND) 240 in the arithmetic device 200 by the wiring line 74.

As shown in FIG. 4B, it is preferable that the wiring lines 71, 72, 73, and 74 are wired in an insertion portion (D portion) of the second case 20 through a seal member 80. The seal member 80 is, for example, an elastic member, such as rubber. The seal member 80 has wiring holes 80a into which the wiring lines are inserted, and is fitted into the wiring hole 20f of the second case 20 with an outline portion 80b and sealable interference. Although in this embodiment, retention portions 80c having an outline greater than the inner shape of the wiring hole 20f of the second case 20 are provided at both ends of the seal member 80, the retention portions 80c may not be provided if the seal member 80 does not easily fall out due to the interference of the wiring hole 20f and the outline portion 80b.

In the sensor device 100, the sensor element 60 which is formed by simply stacking the quartz crystal plates 40 serving as a piezoelectric substance and the electrodes 50 is pressed in the staking (lamination) direction of the quartz crystal plates 40 and the electrodes 50 by the first case 10 and the second case 20. The first case 10, the second case 20, and a pressing portion arranged in the connection portion of the first case 10 and the second case 20 connect the first case 10 and the second case 20 while pressing the sensor element 60, thereby preventing misalignment of the quartz crystal plates 40 serving as a piezoelectric substance and the electrodes 50 of the sensor element 60. Accordingly, it is possible to suppress degradation in sensitivity due to misalignment of the quartz crystal plates 40 and the electrode caused by vibration or impact during an integration operation of the sensor device 100 in the device, thereby obtaining the sensor device 100 capable of maintaining high sensitivity.

Misalignment of the quartz crystal plates 40 and the electrodes 50 will be described with reference to FIG. 2B. As shown in FIG. 2B, the quartz crystal plates 41a and 41b, the quartz crystal plates 42a and 42b, and the quartz crystal plates 43a and 43b respectively detect the force components in the $\alpha$, $\beta$, and $\gamma$ directions. For example, in the quartz crystal plates 42a and 42b, in order to detect the force in the $\alpha$ direction, the quartz crystal plates 42a and 42b should be laminated such that the X-axis directions thereof accurately align with each other. Accordingly, a shift of the quartz crystal plates 41a and 41b in the X-axis direction is referred to as misalignment. Even if the quartz crystal plates 41a and 41b, the quartz crystal plates 42a and 42b, and the quartz crystal plates 43a and 43b are respectively accurately laminated, a shift of the quartz crystal plates 41a and 41b and the quartz crystal plates 42a and 42b in the rotation direction relative to the $\gamma$ axis is also referred to as misalignment. In this way, a shift of the quartz crystal plates which detect the force in the same force detection axis direction and a shift of quartz crystal units which detect the force indifferent force detection axis direction are referred to as misalignment.

Although the quartz crystal plates and the electrodes are hardly affected by a shift in the rotation direction relative to the $\gamma$ axis, the quartz crystal plates and the electrodes are relatively shifted in the $\alpha$ and $\beta$ directions, and therefore, a functional region as a sensor decreases, making it difficult to obtain predetermined precision. Accordingly, a relative shift of the electrodes in the $\alpha$ and $\beta$ directions from the quartz crystal plates is also referred to as misalignment.

The sensor element 60 is stored to be covered with the first case 10 and the second case 20, thereby preventing external contaminants such as, for example, water, medicine, oil, or the like from entering the case. In particular, as shown in FIGS. 1A to 1C, the gasket 30 is used as a pressing portion, thereby further obtaining a seal effect. Therefore, with the use in a robot which is used in a harsh external environment, it is possible to realize a reliable robot.

Second Embodiment

Figure 5A:
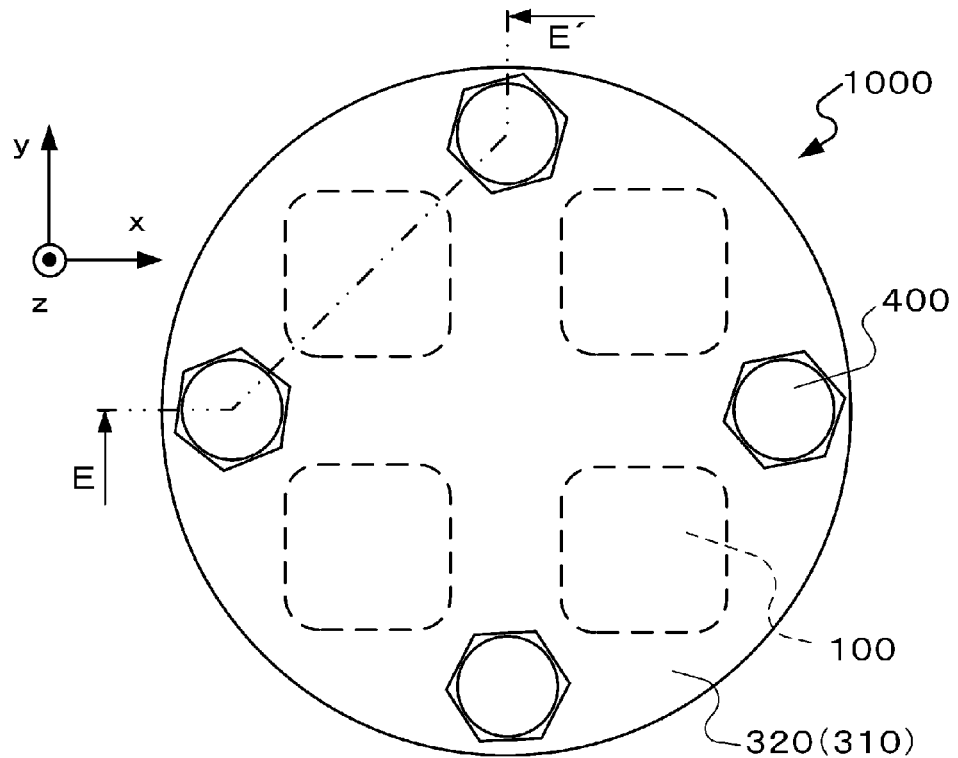
FIG. 5A is a plan view showing a force detection device according to a second embodiment.
Figure 5B:
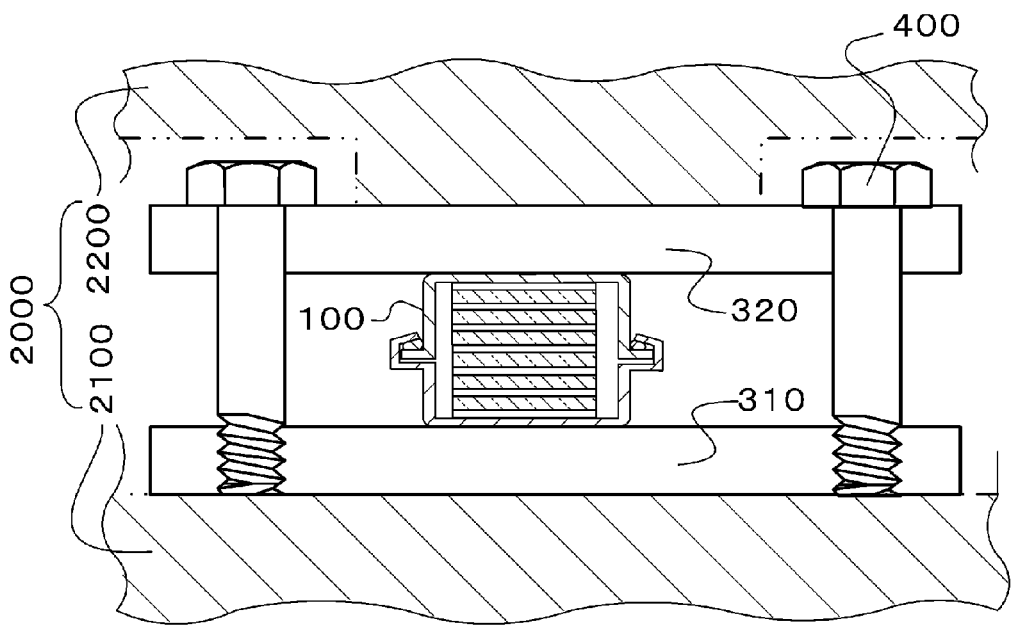
FIG. 5B is a sectional view along line E-E' in FIG. 5A.

As a second embodiment, a force detection device in which the sensor device 100 is integrated will be described. FIGS. 5A and 5B show a force detection device 1000 according to the second embodiment. FIG. 5A is a plan view, and FIG. 5B is a sectional view along line E-E' shown in FIG. 5A. As shown in FIGS. 5A and 5B, in the force detection device 1000 of this embodiment, four sensor devices 100 are clamped by a first base 310 and a second base 320. The first base 310 and the second base 320 are configured such that bolts 400 serving as a fastening member are screwed and fixed into screw holes formed in the first base 310 to press the sensor device 100. Accordingly, a pressure of about 1 t is applied to the sensor device 100.

Figure 6:
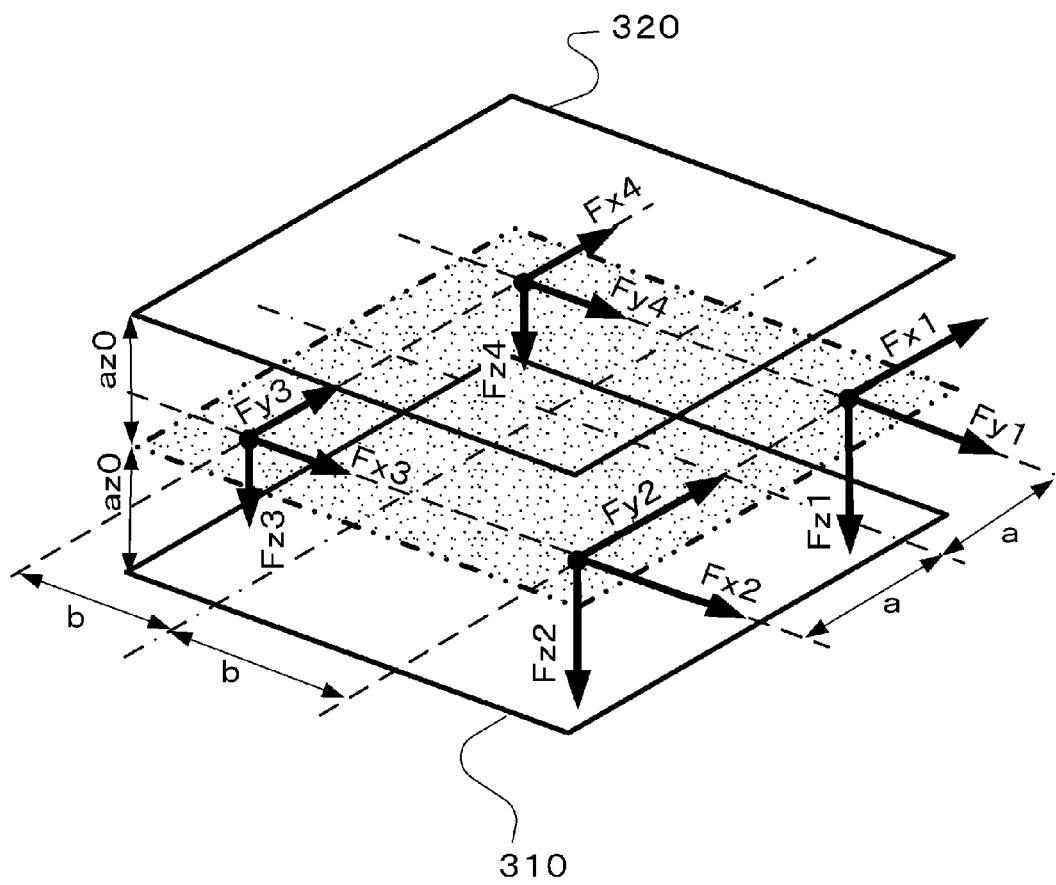
FIG. 6 is a schematic view illustrating torque detection of the force detection device according to the second embodiment.

The force detection device 1000 is mounted in a detection device mounting portion 2000 of a device to be integrated by a mounting mechanism (not shown), and detects a force between a detection device mounting portion 2100 and a detection device mounting portion 2200. The force detection device 1000 of this embodiment is configured such that four sensor devices 100 are fixed, in addition to detection of the force in the x, y, and z directions shown in the drawing, rotation torque Tx, Ty, and Tz between the first base 310 and the second base 320 can be calculated on the basis of a schematic view of FIG. 6 and the following computational expression from the distance between the four sensor devices 100 arranged.

$Fx=Fx1+Fx2+Fx3+Fx4$ $Fy=Fy1+Fy2+Fy3+Fy4$ $Fz=Fz1+Fz2+Fz3+Fz4$ $Mx=b\times(Fz1+Fz2-Fz3-Fz4)$ $My=a\times(-Fz1+Fz2-Fz3-Fz4)$ $Mz=b\times(-Fx1-Fx2+Fx3+Fx4)+a\times(Fy1+Fy4-Fy2-Fy3)$ $ax=(Fx\times az0-My)/Fz$ $ay=(Fy\times az0+My)/Fz$ $Tx=b\times(Fz1+Fz2-Fz3-Fz4)+Fy\times az0$ $Ty=a\times(-Fz1+Fz2+Fz3-Fz4)-Fx\times az0$ Although the force detection device 1000 is a so-called 6-axis force detection device which includes four sensor devices 100, the invention is not limited thereto. The force detection device 1000 may be a force detection device which includes one sensor device 100 or two or more sensor devices 100 depending on the force to be detected.

Third Embodiment

Figure 7:
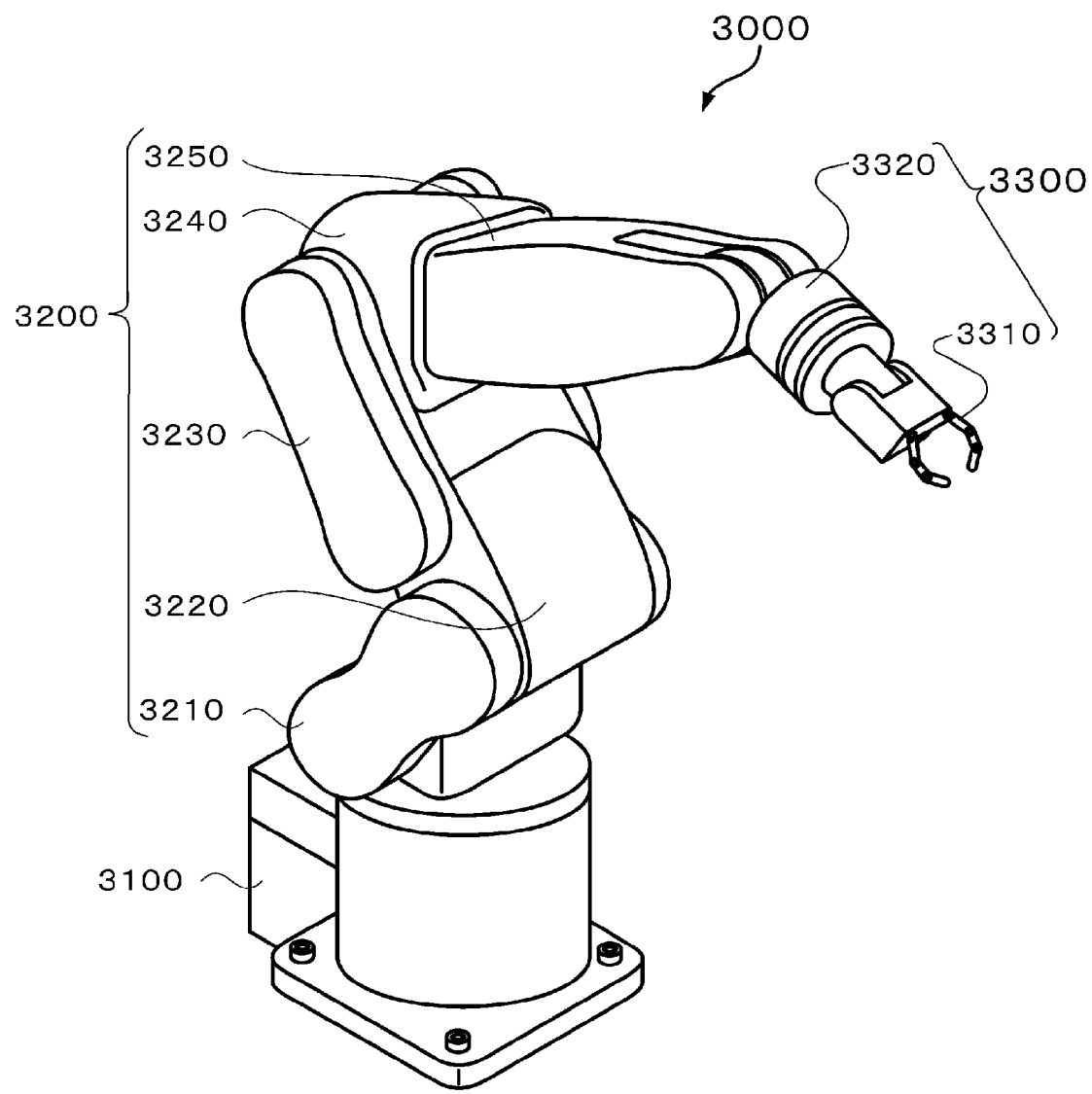
FIG. 7 is a diagram showing a robot according to a third embodiment.

As a third embodiment, a robot which includes the force detection device 1000 will be described. FIG. 7 is a diagram showing the configuration of a robot 3000 using the force detection device 1000 according to the above-described embodiment. The robot 3000 includes a main body portion 3100, an arm portion 3200, a robot hand portion 3300, and the like. The main body portion 3100 is fixed to, for example, a floor, a wall, a ceiling, a movable truck, or the like. The arm portion 3200 is provided to be movable relative to the main body portion 3100. The main body portion 3100 is embedded with an actuator (not shown) which generates power for rotating the arm portion 3200, a control unit which controls the actuator, and the like.

The arm portion 3200 includes a first frame 3210, a second frame 3220, a third frame 3230, a fourth frame 3240, and a fifth frame 3250. The first frame 3210 is rotatably or bendably connected to the main body portion 3100 through a rotary bending shaft. The second frame 3220 is connected to the first frame 3210 and the third frame 3230 through a rotary bending shaft. The third frame 3230 is connected to the second frame 3220 and the fourth frame 3240 through a rotary bending shaft. The fourth frame 3240 is connected to the third frame 3230 and the fifth frame 3250 through a rotary bending shaft. The fifth frame 3250 is connected to the fourth frame 3240 through a rotary bending shaft. The arm portion 3200 moves with the composite rotation or bending of each of the frames 3210 to 3250 around the corresponding rotary bending shaft under the control of the control unit.

In the fifth frame 3250 of the arm portion 3200, the robot hand portion 3300 is attached to aside that is different from a connection portion to the fourth frame 3240. A robot hand 3310 which can grip an object is connected to the fifth frame 3250 by a robot hand connection portion 3320 which has an internal motor for rotation operation.

The force detection device 1000 of the second embodiment is embedded in the robot hand connection portion 3320 along with the motor, and when the robot hand portion 3300 has moved to a predetermined operation position under the control of the control unit, detects, as a force, contact with an obstacle, contact with an object by an operation command beyond a predetermined position, or the like by the force detection device 1000, and feeds back the detection result to a control unit of the robot 3000, thereby allowing the robot to carry out an avoidance operation.

With the use of the robot 3000, it is possible to obtain a robot which can do safe and intricate jobs including an obstacle avoidance operation, an object damage avoidance operation, or the like which is handled with difficulty by position control in the related art. The invention is not limited to this embodiment, and may be applied to a two or more armed robot.

Other Embodiments

Figure 8A:
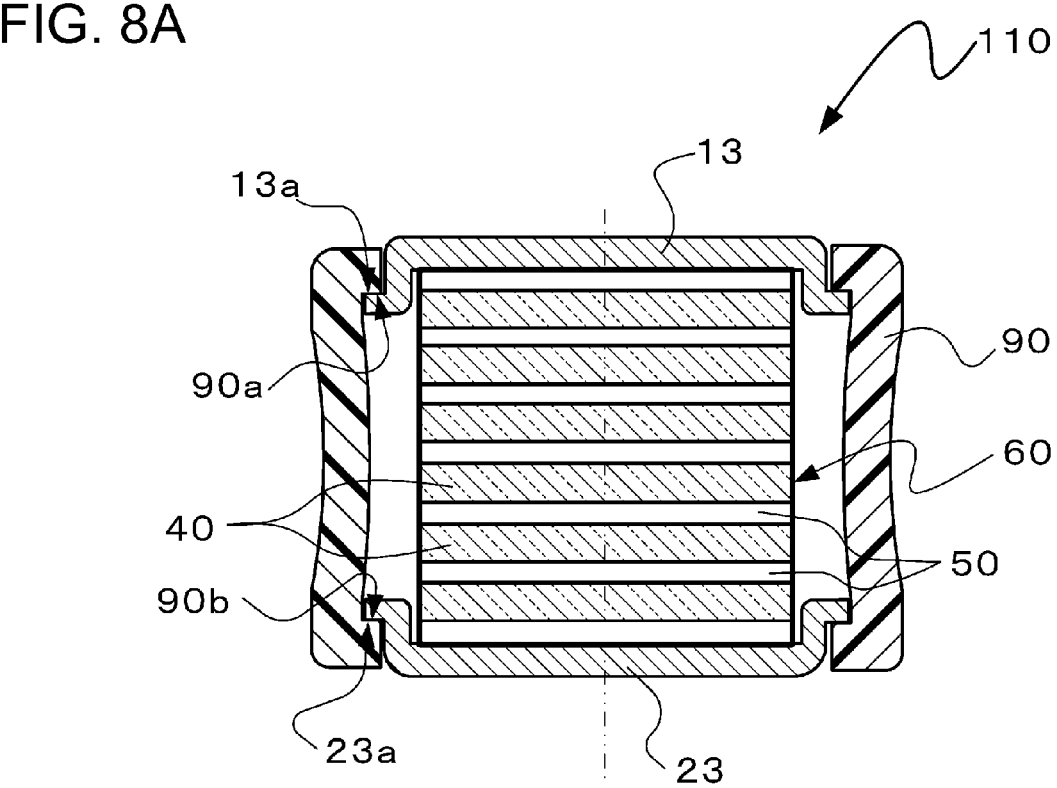
FIG. 8A is a schematic sectional view showing a sensor device according to another embodiment.
Figure 8B:
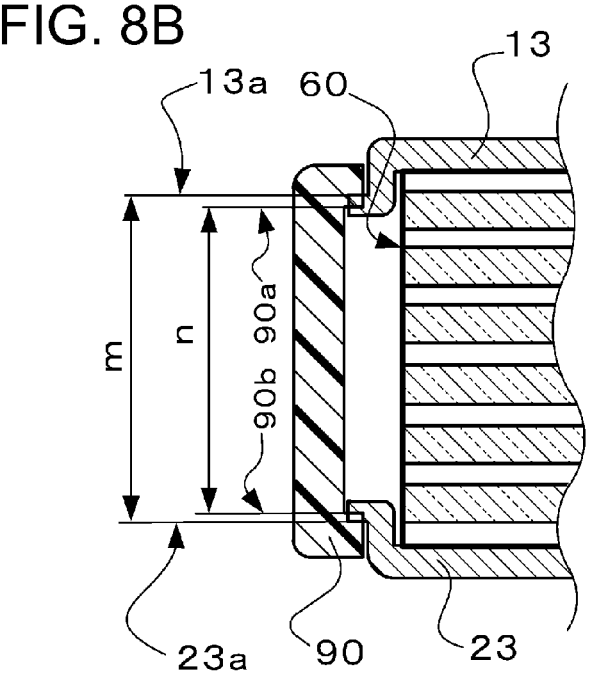
FIG. 8B is an explanatory view of fitting of a cylindrical case.

The sensor device 100 of the first embodiment may be a sensor device 110 shown in FIGS. 8A and 8B. FIG. 8A is a sectional view of the sensor device 110 according to another embodiment, and FIG. 8B is a sectional view illustrating an integration state of the sensor device 110 according to another embodiment. As shown in FIG. 8A, in the sensor device 110, a sensor element 60 is stored in an interior defined by a cap 13 serving as a first case, a cap 23 serving as a second case, and a cylindrical case 90 serving as a pressing mechanism.

The cylindrical case 90 is formed of an elastic material, for example, rubber, an elastic elastomer, plastic, or the like, and inner circumferential stepped portions 90a and 90b are formed in the openings at both ends of the cylindrical case 90. A fitting portion 13a is formed on the outer circumference of the cap 13, and a fitting portion 23a is formed on the outer circumference of the cap 23. After the caps 13 and 23 are placed at both ends of the sensor element 60 in the lamination direction, a fitting region m is formed by the fitting portions 13a and 23a. The fitting region m is set to be greater than a gap n between the inner circumferential stepped portions 90a and 90b of the cylindrical case 90, and the cylindrical case 90 is fitted to the caps 13 and 23 placed on the sensor element 60, so that the cylindrical case 90 is stretched.

The cylindrical case 90 is stretched and fitted to the caps 13 and 23, so that the caps 13 and 23 are attracted by the cylindrical case 90, and a pressing force is applied to the sensor element 60. Accordingly, the pressing force is constantly applied to the sensor element 60. Therefore, the sensor device 110 can obtain high precision without causing misalignment of the quartz crystal plates 40 and the electrodes 50 of the sensor element 60 during a job, such as integration in the force detection device. With the configuration of the sensor device 110, the sensor element 60 is sealed, thereby obtaining the reliable sensor device 110 which is not affected by the external environmental conditions.

If a bellows portion described with reference to FIG. 3B is formed in the cylindrical case 90, it is possible to increase an elastic deformation region of the cylindrical case 90 and to form a metallic cylindrical case 90. The cylindrical case 90 may be molded integrally with the sensor element 60 and the caps 13 and 23 by resin outsert molding. With outsert integral molding, internal airtightness of the sensor device 110 significantly increases, thereby obtaining an even more reliable sensor device.

The entire disclosure of Japanese Patent Application No. 2011-089841 filed Apr. 14, 2011 is expressly incorporated herein by reference.

What is claimed is:

1. A sensor device comprising:
   a sensor element including a piezoelectric substance laminated with an electrode;
   a first case and a second case which house the sensor element therein; and
   a pressing portion which presses the sensor element in a lamination direction of the piezoelectric substance and the electrode by the first and second cases.

2. The sensor device according to claim 1,
   wherein the pressing portion is an elastic member which is pressed by the first and second cases.

3. The sensor device according to claim 2,
   wherein the elastic member is a gasket which is formed of rubber, an elastic elastomer, or a metal.

4. The sensor device according to claim 1,
   wherein the pressing portion is a bellows portion which is formed in the first or second case.

5. The sensor device according to claim 1,
   wherein the first case and the second case have connection portions which connect the first and second cases together.

6. The sensor device according to claim 1,
   wherein, when a Z direction is the lamination direction of the sensor element, and an X direction and a Y direction are directions which are orthogonal to the Z direction and are orthogonal to each other, the sensor device includes at least a first sensor element which detects a force in the X direction, a second sensor element which detects a force in the Y direction, and a third sensor element which detects a force in the Z direction.

7. The sensor device according to claim 1,
   wherein the piezoelectric substance is quartz crystal.

8. A force detection device comprising:
   the sensor device according to claim 1.

9. A robot comprising:
   the force detection device according to claim 8.

10. A force detection device comprising:
    a sensor element including a piezoelectric substance laminated with an electrode;
    a first case and a second case which house the sensor element therein;
    a pressing portion which presses the sensor element in a lamination direction of the piezoelectric substance and the electrode by the first and second cases; and
    a clamping portion which clamps the sensor element housed in the first and second cases via the first and second cases.

11. The force detection device according to claim 10,
    wherein the force detection device includes four of the sensor elements.

12. A robot comprising:
a sensor element including a piezoelectric substance laminated with an electrode;
a first case and a second case which house the sensor element therein;
a pressing portion which presses the sensor element in a lamination direction of the piezoelectric substance and the electrode by the first and second cases;
a clamping portion which clamps the sensor element housed in the first and second cases via the first and second cases;
an arm portion which includes a plurality of rotatable joints; and
a gripping portion which selectively grips an object.

* * * * *